United States Patent
Takada et al.

(10) Patent No.: US 11,513,649 B2
(45) Date of Patent: Nov. 29, 2022

(54) SENSOR DEVICE AND INPUT DEVICE

(71) Applicant: Japan Display Inc., Tokyo (JP)

(72) Inventors: Naoki Takada, Tokyo (JP); Toshihiko Tanaka, Tokyo (JP); Nobuo Tsubokura, Tokyo (JP); Takuya Nishimoto, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/233,559

(22) Filed: Apr. 19, 2021

(65) Prior Publication Data

US 2021/0240305 A1 Aug. 5, 2021

Related U.S. Application Data

(63) Continuation of application No. PCT/JP2019/038662, filed on Sep. 30, 2019.

(30) Foreign Application Priority Data

Oct. 19, 2018 (JP) .............................. JP2018-197677

(51) Int. Cl.
*G06F 3/044* (2006.01)
*G06F 3/041* (2006.01)
*G05G 1/10* (2006.01)

(52) U.S. Cl.
CPC ............. *G06F 3/0446* (2019.05); *G05G 1/10* (2013.01); *G06F 3/0416* (2013.01)

(58) Field of Classification Search
None
See application file for complete search history.

(56) References Cited

U.S. PATENT DOCUMENTS

| 2006/0256090 A1 | 11/2006 | Huppi |
| 2017/0052617 A1 | 2/2017 | Okuzumi et al. |
| 2018/0373351 A1 | 12/2018 | Sawada et al. |
| 2019/0250740 A1 | 8/2019 | Okuzumi et al. |
| 2020/0233521 A1* | 7/2020 | Sasaki ................... G06F 3/0393 |
| 2020/0301547 A1* | 9/2020 | Mori ..................... G06F 3/0488 |

FOREIGN PATENT DOCUMENTS

| JP | 6342105 B1 | 6/2018 |
| WO | 2015/174092 A1 | 11/2015 |
| WO | 2017/094234 A1 | 6/2017 |

OTHER PUBLICATIONS

International Search Report and Written Opinion dated Dec. 3, 2019, received for PCT Application PCT/JP2019/038662, Filed on Sep. 30, 2019, 9 pages including English Translation.
Office Action dated Jul. 12, 2022 in Japanese Patent Application No. 2018-197677, 4 pages. (Submitting English Translation only).

* cited by examiner

*Primary Examiner* — Stephen T. Reed
(74) *Attorney, Agent, or Firm* — Xsensus LLP

(57) ABSTRACT

According to one embodiment, a sensor device includes an electrostatic capacitive touch panel, and an input device mounted on the touch panel. The input device includes a knob rotatably disposed about a rotation axis, and a first conductor held by the knob and being in contact with the touch panel in a part of a circumference about the rotation axis.

13 Claims, 14 Drawing Sheets

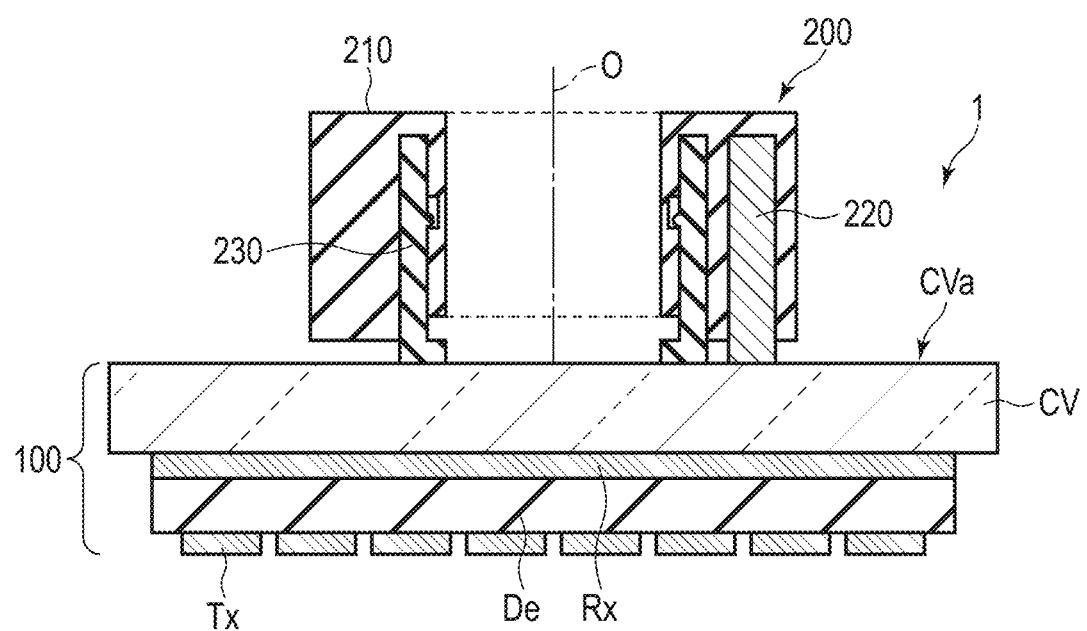
F I G. 2

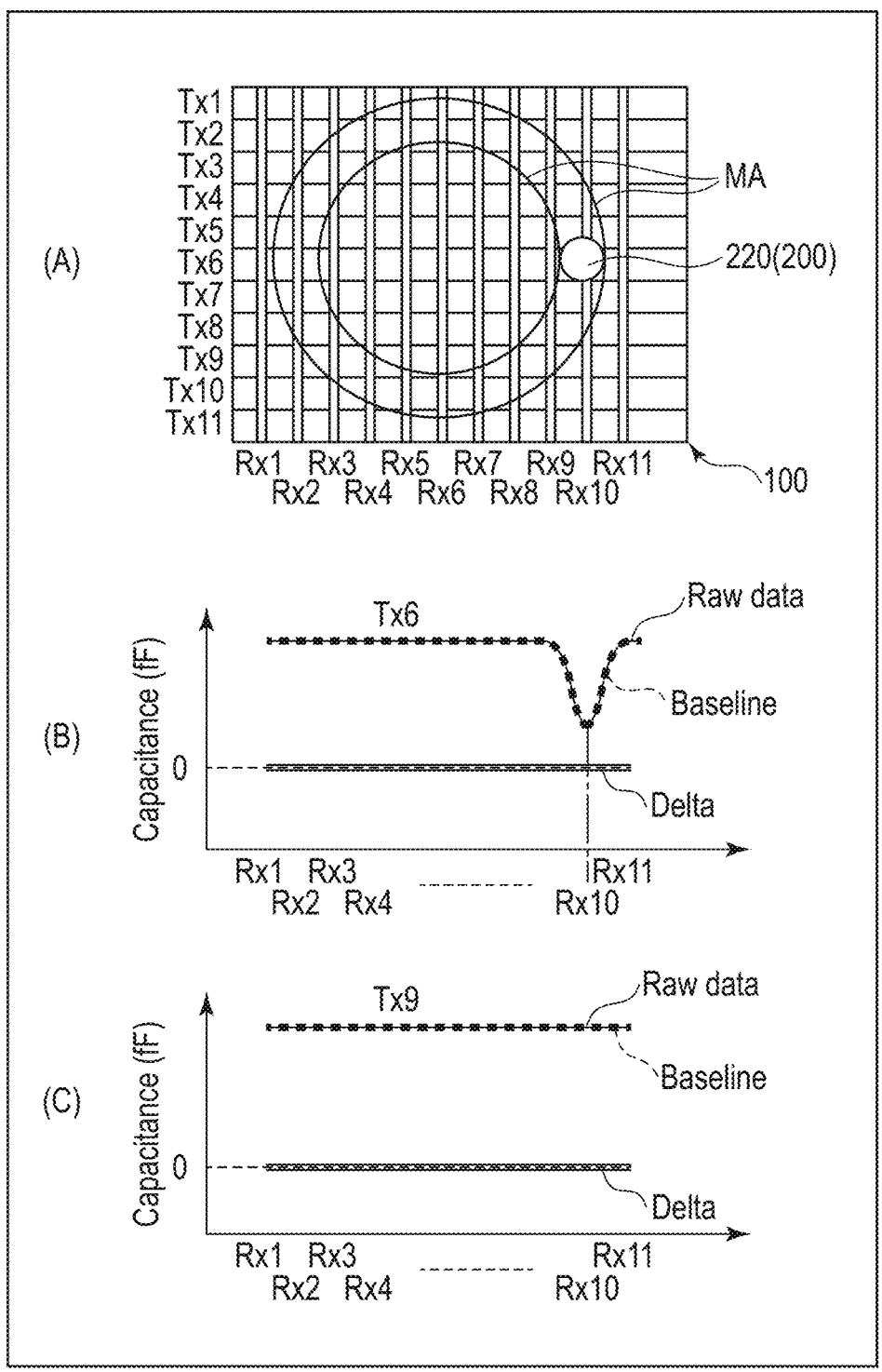
F I G. 6

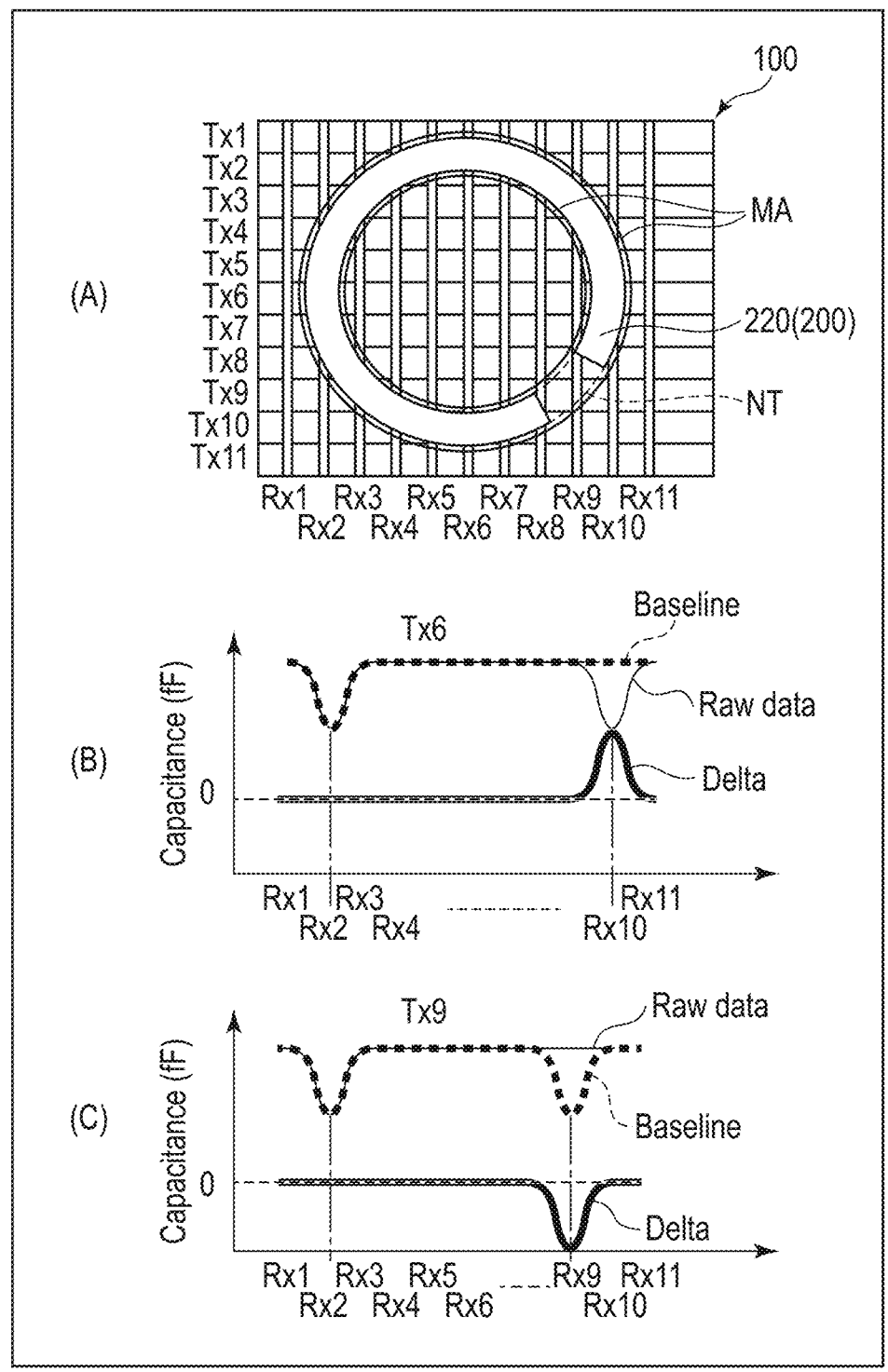
F I G. 10

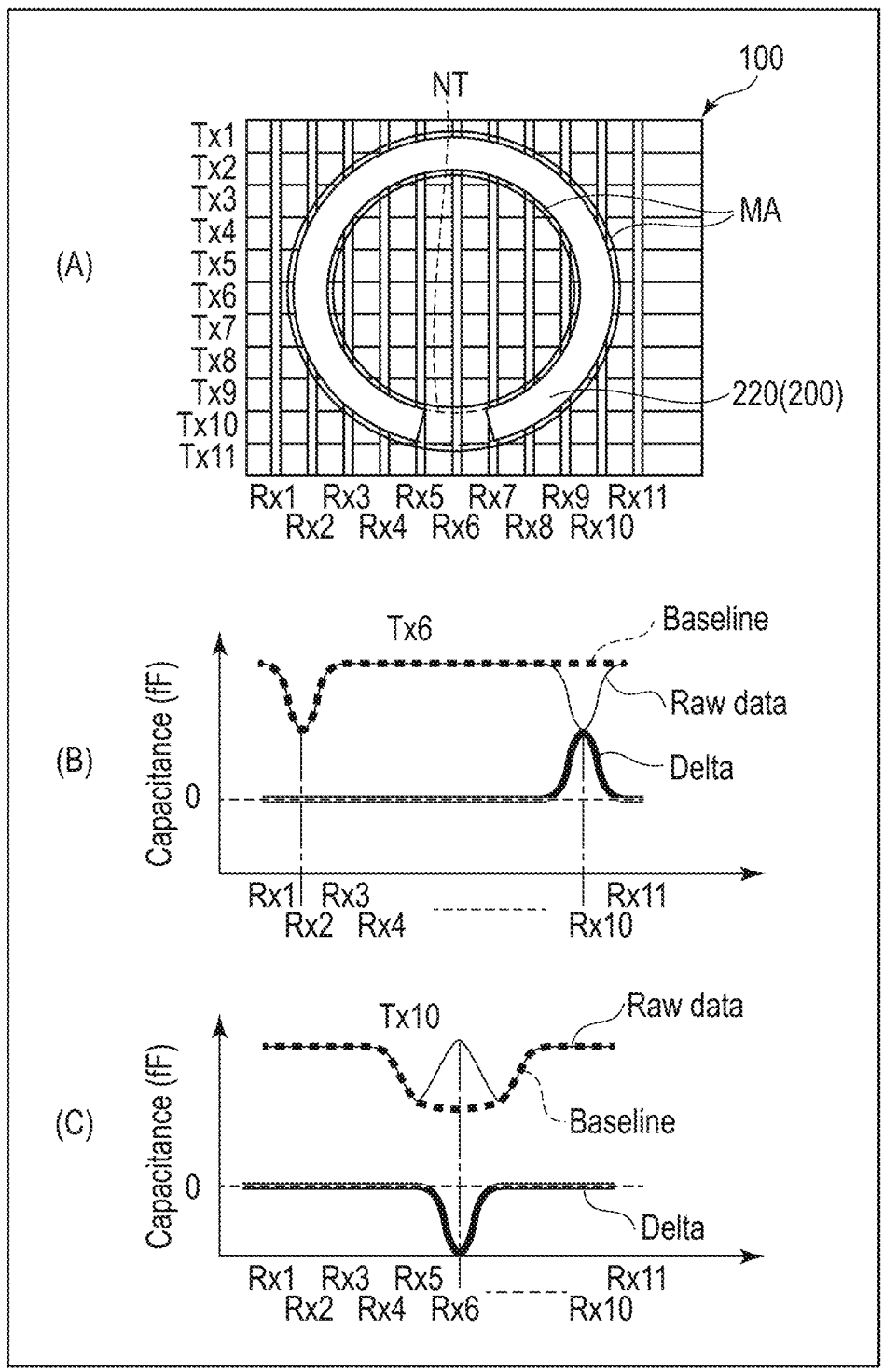
F I G. 11

SENSOR DEVICE AND INPUT DEVICE

CROSS-REFERENCE TO RELATED APPLICATIONS

This application is a Continuation Application of PCT Application No. PCT/JP2019/038662, filed Sep. 30, 2019 and based upon and claiming the benefit of priority from Japanese Patent Application No. 2018-197677, filed Oct. 19, 2018, the entire contents of all of which are incorporated herein by reference.

FIELD

Embodiments described herein relate generally to a sensor device and an input device.

BACKGROUND

Recently, as an interface of a display device or the like, a sensor which detects contact or approach of an object such as a finger has been put into practical use. As an example, an input device detachable from the display device is disclosed. This input device mechanically, optically or magnetically detects a rotation operation of an operation input portion which rotationally moves with respect a stationary portion. A detection signal is transmitted to the display device by wireless communication.

BRIEF DESCRIPTION OF THE DRAWINGS

FIG. 2 is a cross-sectional view showing the main part of the sensor device 1 shown in FIG. 1.

FIG. 6 is an illustration for explaining an initial state immediately after power is turned on.

FIG. 9 is an illustration for explaining an initial state immediately after power is turned on.

FIG. 10 is an illustration for explaining a state where the conductor 220 is rotated 45° with respect to the initial state.

FIG. 11 is an illustration for explaining a state where the conductor 220 is rotated 90° with respect to the initial state.

DETAILED DESCRIPTION

Figure 1:
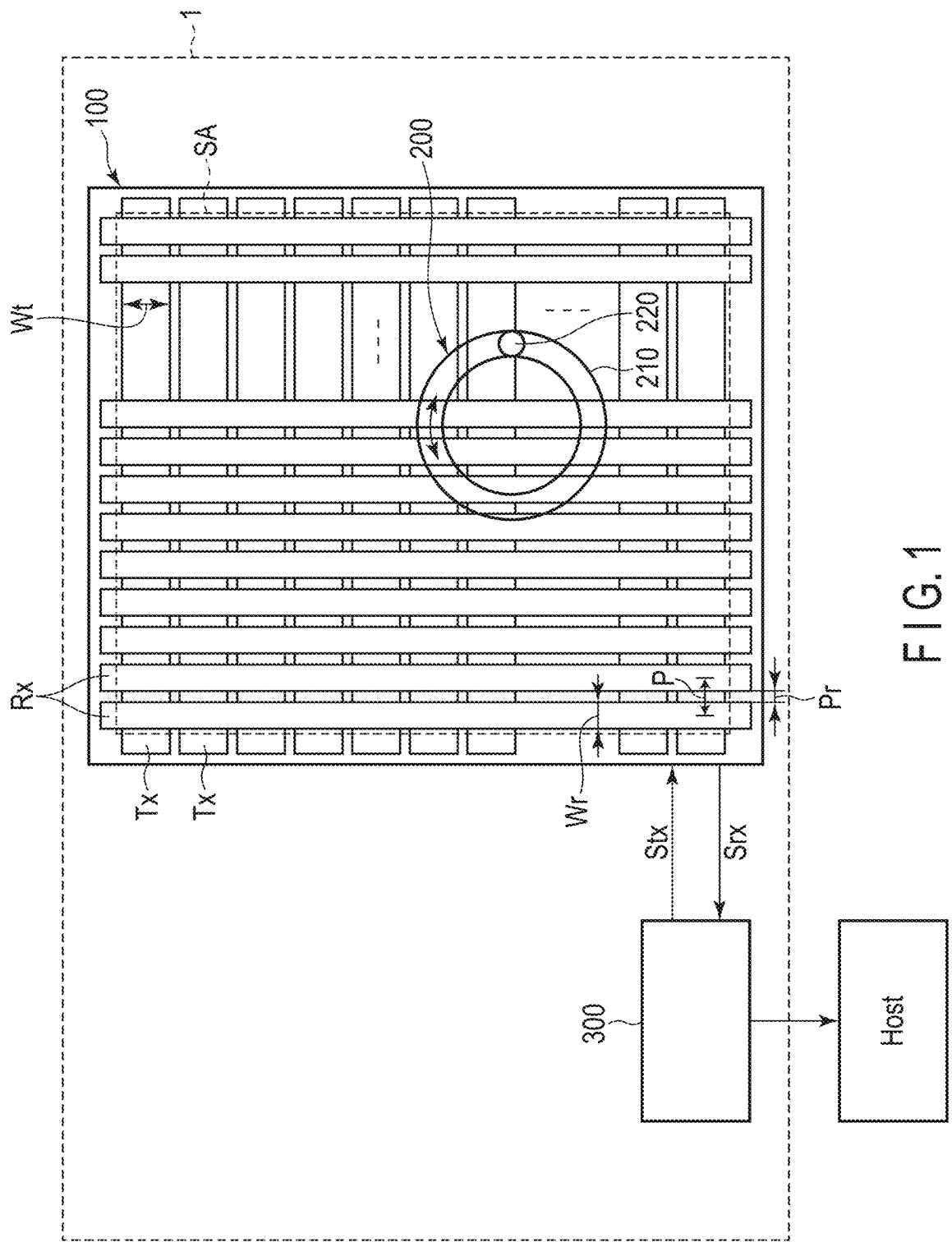
FIG. 1 is an illustration showing a configuration example of a sensor device 1 in the present embodiment.

In general, according to one embodiment, there is provided a sensor device comprising an electrostatic capacitive touch panel, and an input device mounted on the touch panel. The input device comprises a knob rotatably disposed about a rotation axis, and a first conductor held by the knob and being in contact with the touch panel in a part of a circumference about the rotation axis.

According to another embodiment, there is provided an input device mounted on an electrostatic capacitive touch panel comprising a knob rotatably disposed about a rotation axis, and a first conductor held by the knob and being in contact with the touch panel in a part of a circumference about the rotation axis.

The present embodiment will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, constituent elements which function in the same or a similar manner to those described in connection with preceding drawings are denoted by the same reference numbers, and detailed descriptions of them that are considered redundant are omitted unless necessary.

FIG. 1 is an illustration showing a configuration example of a sensor device 1 in the present embodiment. The sensor device 1 comprises a touch panel 100, an input device 200 and a sensor controller 300. The touch panel 100 is, for example, an electrostatic capacitive touch panel. The mutual capacitive touch panel 100 will be described here.

The touch panel 100 comprises drive electrodes Tx and detection electrodes Rx. The drive electrodes Tx are arranged at intervals in one direction. The detection electrodes Rx are arranged at intervals, and are disposed crossing the drive electrodes Tx. An area SA in which the drive electrodes Tx and the detection electrodes Rx cross each other corresponds to a detection area in which contact or approach of an object with or to the touch panel 100 is detected.

The sensor controller 300 controls the touch panel 100. That is, the sensor controller 300 transmits a drive signal Stx to each drive electrode Tx. Accordingly, the drive electrode Tx produces a capacitance between itself and the detection electrode Rx. When the drive signal Stx is supplied to the drive electrode Tx, the detection electrode Rx outputs a sensor signal Srx required for sensing (that is, a signal based on a change of the capacitance between the drive electrode Tx and the detection electrode Rx). The sensor controller 300 receives the sensor signal Srx from each detection electrode Rx, detects the presence or absence of an object contacting or approaching the touch panel 100, and detects the position coordinates or the like of the object.

The input device 200 is mounted in the detection area SA of the touch panel 100. Although the details of the input device 200 will be described later, the input device 200 comprises a rotatably disposed knob 210 and a conductor 220 held by the knob 210. The conductor 220 is opposed to and in contact with the touch panel 100. Note that the conductor 220 may be opposed to and disposed close to the touch panel 100 without contacting the touch panel 100.

The sensor controller 300 transmits the drive signal to each drive electrode Tx, receives the sensor signal from each detection electrode Rx, and detects rotation information of the knob 210 and pressing information of the knob 210. The rotation information includes the rotation angle of the knob 210, the position coordinates of the conductor 220, and the like. The pressing information includes the presence or absence of the pressing operation of the knob 210, the position coordinates of the conductor 220 when pressed. The sensor controller 300 transmits the rotation information and the pressing information to the host side.

Note that the touch panel 100 is not limited to a mutual capacitive type but may be a self-capacitive type.

FIG. 2 is a cross-sectional view showing the main part of the sensor device 1 shown in FIG. 1. In the touch panel 100, a dielectric layer De is located between the drive electrodes Tx and the detection electrodes Rx. A cover member CV covers the detection electrodes Rx. A surface CVa of the cover member CV is a surface facing the user, and is a surface which can be touched by the user or an object. The input device 200 is disposed on the surface CVa. The detection electrodes Rx are located between the drive electrodes Tx and the input device 200.

In the input device 200, a fixed body 230 is fixed to the touch panel 100 by being bonded to the surface CVa or the like. The knob 210 is rotatably disposed with respect to the fixed body 230. The knob 210 is apart from the surface CVa. In the illustrated example, the knob 210 and the fixed body 230 are formed in a tubular shape extending along a rotation axis O. The rotation axis O is, for example, orthogonal to the surface CVa. The knob 210 and the fixed body 230 are formed of an insulating material. The conductor 220 is located more outward than the fixed body 230, and is held by the knob 210. The tip of the conductor 220 is in contact with the surface CVa. The state where the conductor 220 is in contact with the touch panel 100 here corresponds to a state where the conductor 220 is in contact with the cover member CV of the touch panel 100.

Figure 3:
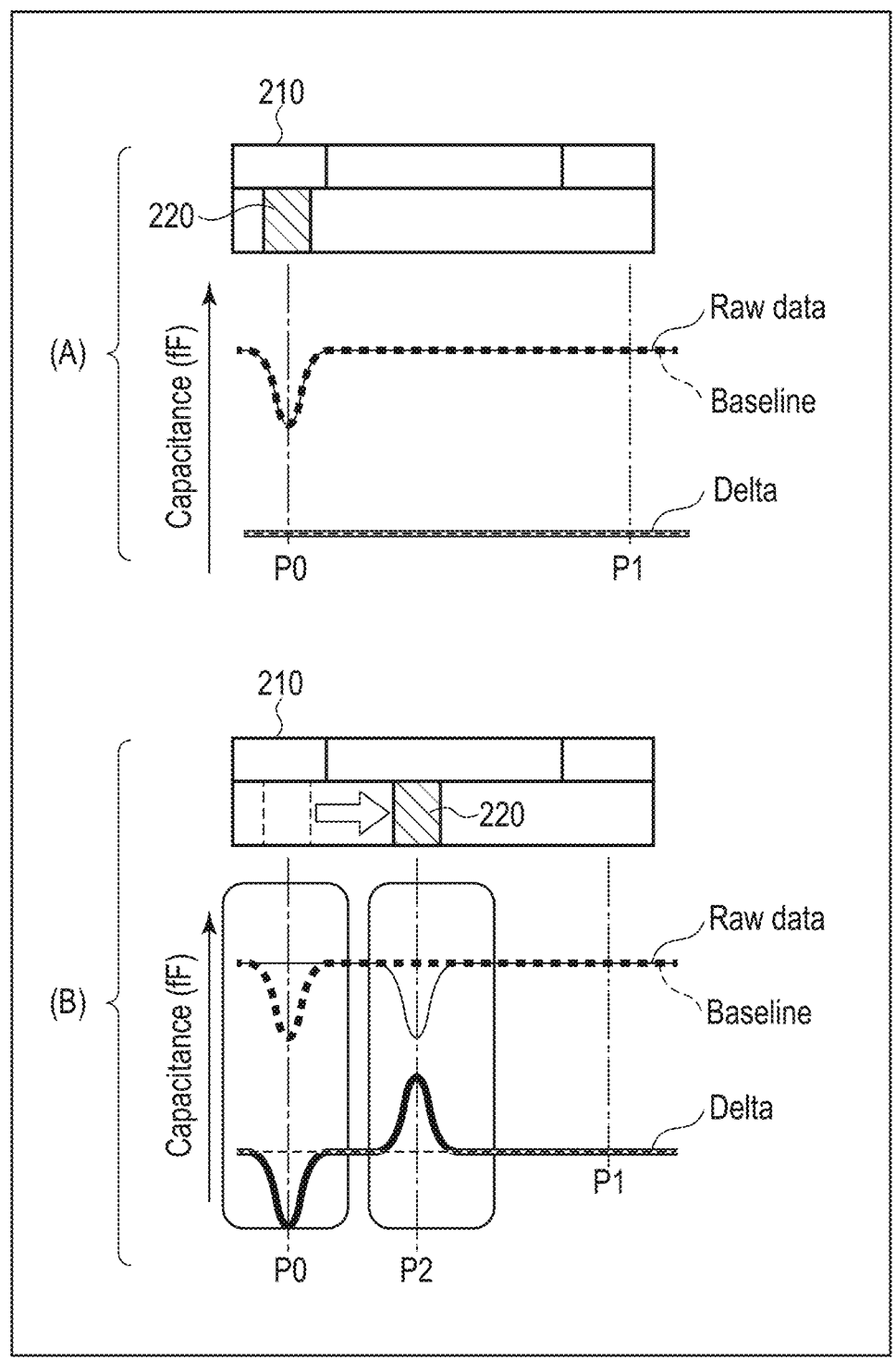
FIG. 3 is an illustration for explaining the principle of detecting rotation information of a knob 210.

FIG. 3 is an illustration for explaining the principle of detecting the rotation information of the knob 210. FIG. 3 (A) is an illustration for explaining an initial state immediately after power is turned on, and FIG. 3 (B) is an illustration for explaining a state after the knob 210 is rotated.

A baseline shown by a dotted line in the drawing is reference data corresponding to the mutual capacitance between the drive electrode Tx and the detection electrode Rx immediately after power is turned on.

Raw data shown by a solid line in the drawing is to data corresponds to the mutual capacitance between the drive electrode Tx and the detection electrode Rx which is updated every frame.

Delta in the drawing is data corresponding to the difference value [(baseline)−(raw data)].

As shown in FIG. 3 (A), in the initial state, the conductor 220 is in contact with the touch panel 100 at a position P0. The raw data value at the position P0 is less than the raw data value at a position P1 at which the conductor 220 is not placed. The raw data values at the other positions at which the conductor 220 is not placed are all the same level. In this initial state, the raw data matches the baseline. Therefore, the delta is zero over the entire area regardless of the position of the conductor 220.

As shown in FIG. 3 (B), in the state where the knob 210 is rotated, the conductor 220 is in contact with the touch panel 100 at a position P2, and is removed from the position P0. Also in this state, the baseline remains unchanged from the initial state. The raw data value at the position P0 increases from the initial state as the conductor 220 is removed, and becomes the same level as the raw data value at the position P1 at which the conductor 220 is not placed. Therefore, the delta at the position P0 becomes a negative signal.

The raw data value at the position P2 decreases from the initial state due to the contact of the conductor 220, and becomes less than the raw data value at the position P1 at which the conductor 220 is not placed. Therefore, the delta at the position P2 becomes a positive signal.

The sensor controller 300 shown in FIG. 1 can detect the rotation information of the knob 210 by performing the signal analysis described with reference to FIG. 3 across the positions of the entire area of the detection area SA.

According to the input device 200 of the present embodiment, an operation involving a rotation such as volume adjustment or icon selection can be easily performed, and operability can be improved as compared with when an operation involving a rotation is performed on a flat touch panel. In addition, the input device 200 does not require a power and does not require a wiring line, either. Therefore, the input device 200 can be easily installed. Furthermore, the installation place of the input device 200 can be freely selected, and the position of an icon on the touch panel side can be freely set.

Figure 4:
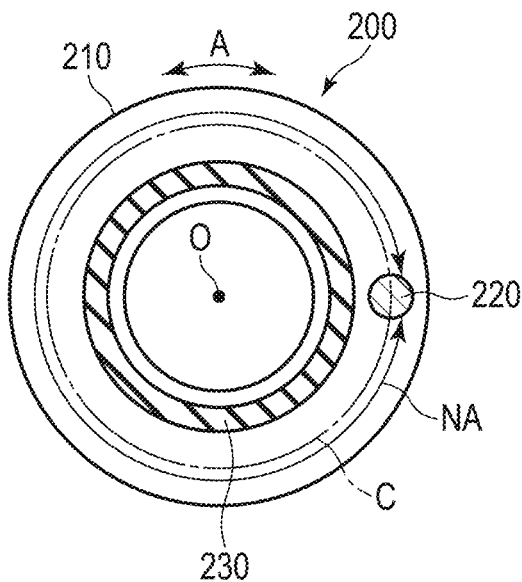
FIG. 4 is an illustration showing the first configuration example of an input device 200.

FIG. 4 is an illustration showing the first configuration example of the input device 200. At a position overlapping the knob 210, a circumference C about the rotation axis X is shown by a dashed-dotted line.

The conductor 220 is located in a part of the circumference C. In the present embodiment, the conductor 220 is formed in a non-annular shape, and an ineffective area NA in which the conductor is not present is formed on the circumference C. In the illustrated example, the conductor 220 is formed in a dot shape. On the circumference C, the length along the circumference C of the conductor 220 is less than the length along the circumference C of the ineffective area NA. As described with reference to FIG. 2, while the conductor 220 is in contact with the touch panel 100, the ineffective area NDA is apart from the touch panel 100.

When the knob 210 is rotated along an arrow A in the drawing about the rotation axis O, the conductor 220 moves on the circumference C. Since the conductor 220 is held by the knob 210, the rotation angle of the conductor 220 is equal to the rotation angle of the knob 210.

Figure 5:
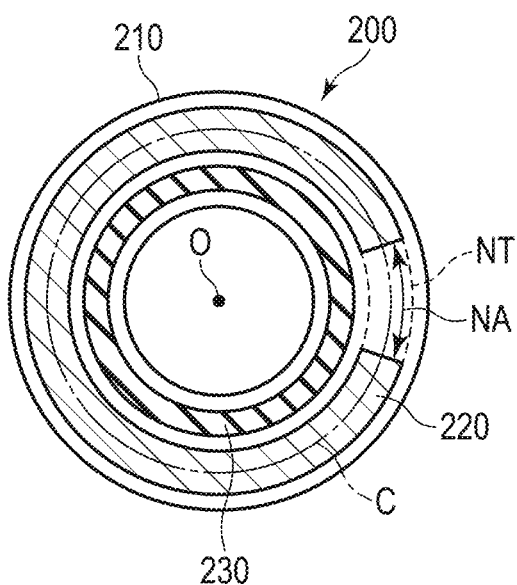
FIG. 5 is an illustration showing the second configuration example of the input device 200.

FIG. 5 is an illustration showing the second configuration example of the input device 200. The second configuration example shown in FIG. 5 is different from the first configuration example shown in FIG. 4 in that the conductor 220 is formed in a C shape. That is, the conductor 220 extends along the circumference C, and comprises a notch NT in a part of the circumference C. An area overlapping the notch NT on the circumference C corresponds to the ineffective area NA. The length along the circumference C of the conductor 220 is greater than ½ of the circumference C. That is, on the circumference C, the length along the circumference C of the conductor 220 is greater than the length along the circumference C of the ineffective area NA. Alternatively, when a line connecting a center O and one end of the conductor 220 is a reference line and the angle of it is 0°, an angle between a line connecting the center O and the other end of the conductor 220 and the reference line on a side along the conductor 220 is greater than 180°. The conductor 220 of the second configuration example is also opposed to and in contact with the touch panel 100 as shown in FIG. 2.

Next, an example of the detection of the rotation information in the first configuration example of the input device 200 will be described with reference to FIGS. 6 to 8.

FIG. 6 is an illustration for explaining an initial state immediately after power is turned on.

FIG. 6 (A) is an illustration showing a state where the conductor 220 of the input device 200 is in contact with the touch panel 100. Here, the touch panel 100 comprises drive electrodes Tx1 to Tx11 and detection electrodes Rx1 to Rx11. An annular area MA in the drawing corresponds to an area in which the conductor 220 can move. In the illustrated initial state, the conductor 220 overlaps the intersection of the drive electrode Tx6 and the detection electrode Rx10.

FIG. 6 (B) shows the baseline, the raw data and the delta data when the drive signal is transmitted to the drive electrode Tx6. The baseline value and the raw data value in the detection electrode Rx10 are less than the baseline values and the raw data values in the other detection electrodes. In all the detection electrodes Rx1 to Rx11, the raw data matches the baseline, and therefore, the delta is zero.

FIG. 6 (C) shows the baseline, the raw data and the delta when the drive signal is transmitted to the drive electrode Tx9. Since the conductor 220 is not present at a position overlapping the drive electrode Tx9, in all the detection electrodes Rx1 to Rx11, the baseline value and the raw data value are the same level, and the delta is zero.

Figure 7:
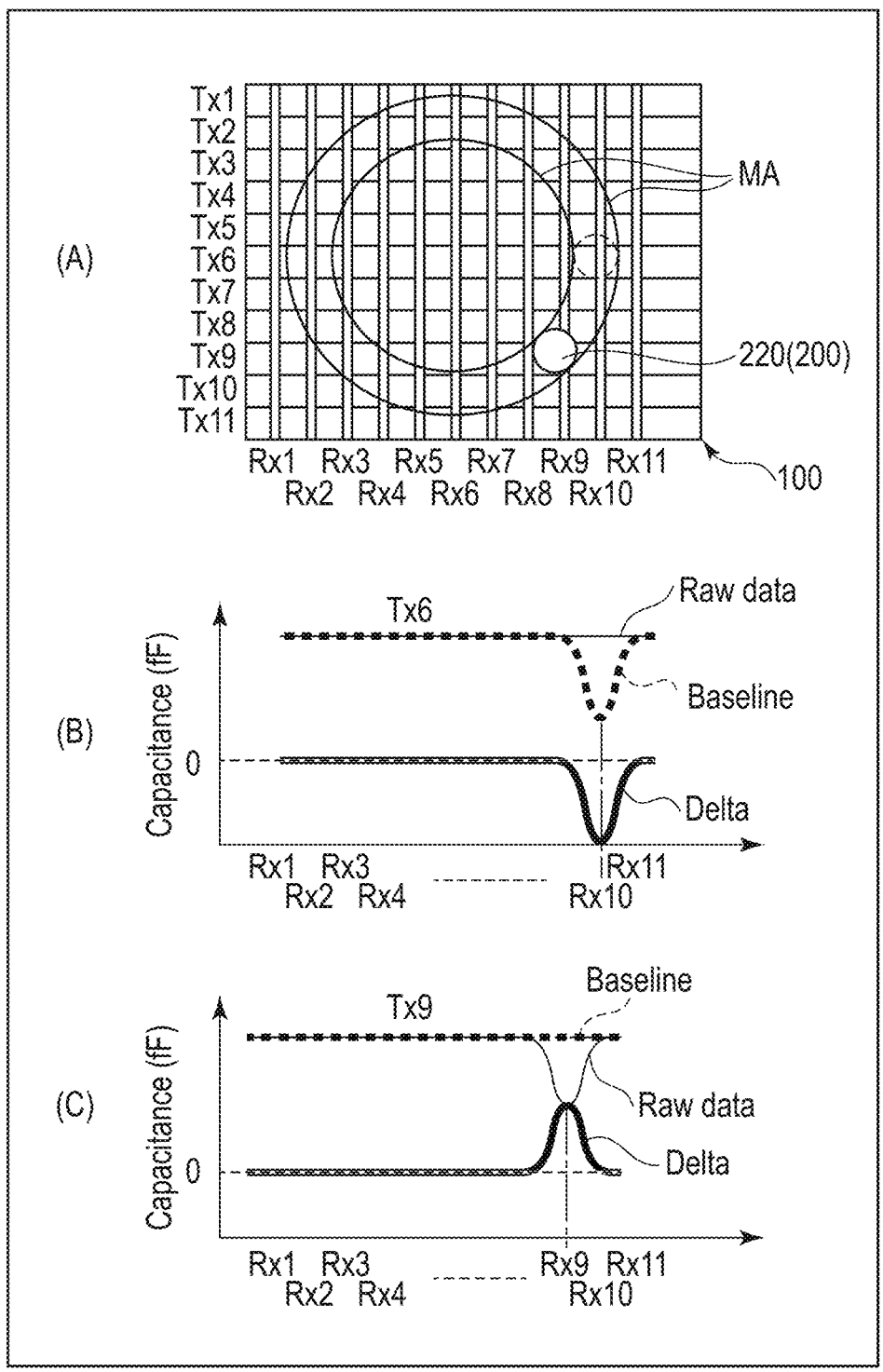
FIG. 7 is an illustration for explaining a state where a conductor 220 is rotated 45° with respect to the initial state.

FIG. 7 is an illustration for explaining a state where the conductor 220 is rotated 45° with respect to the initial state.

As shown in FIG. 7 (A), the conductor 220 overlaps the intersection between the drive electrode Tx9 and the detection electrode Rx9. The conductor 220 is not present at the intersection between the drive electrode Tx6 and the detection electrode Rx10.

FIG. 7 (B) shows the baseline, the raw data and the delta when the drive signal is transmitted to the drive electrode Tx6. The raw data value in the detection electrode Rx10 becomes the same level as the raw data values in the other detection electrodes as the conductor 220 is removed. Therefore, the delta in the detection electrode Rx10 becomes a negative signal.

FIG. 7 (C) shows the baseline, the raw data and the delta when the drive signal is transmitted to the drive electrode Tx9. The raw data value in the detection electrode Rx9 becomes less than the raw data values in the other detection electrodes as the conductor 220 overlaps. Therefore, the delta in the detection electrode Rx9 becomes a positive signal.

Figure 8:
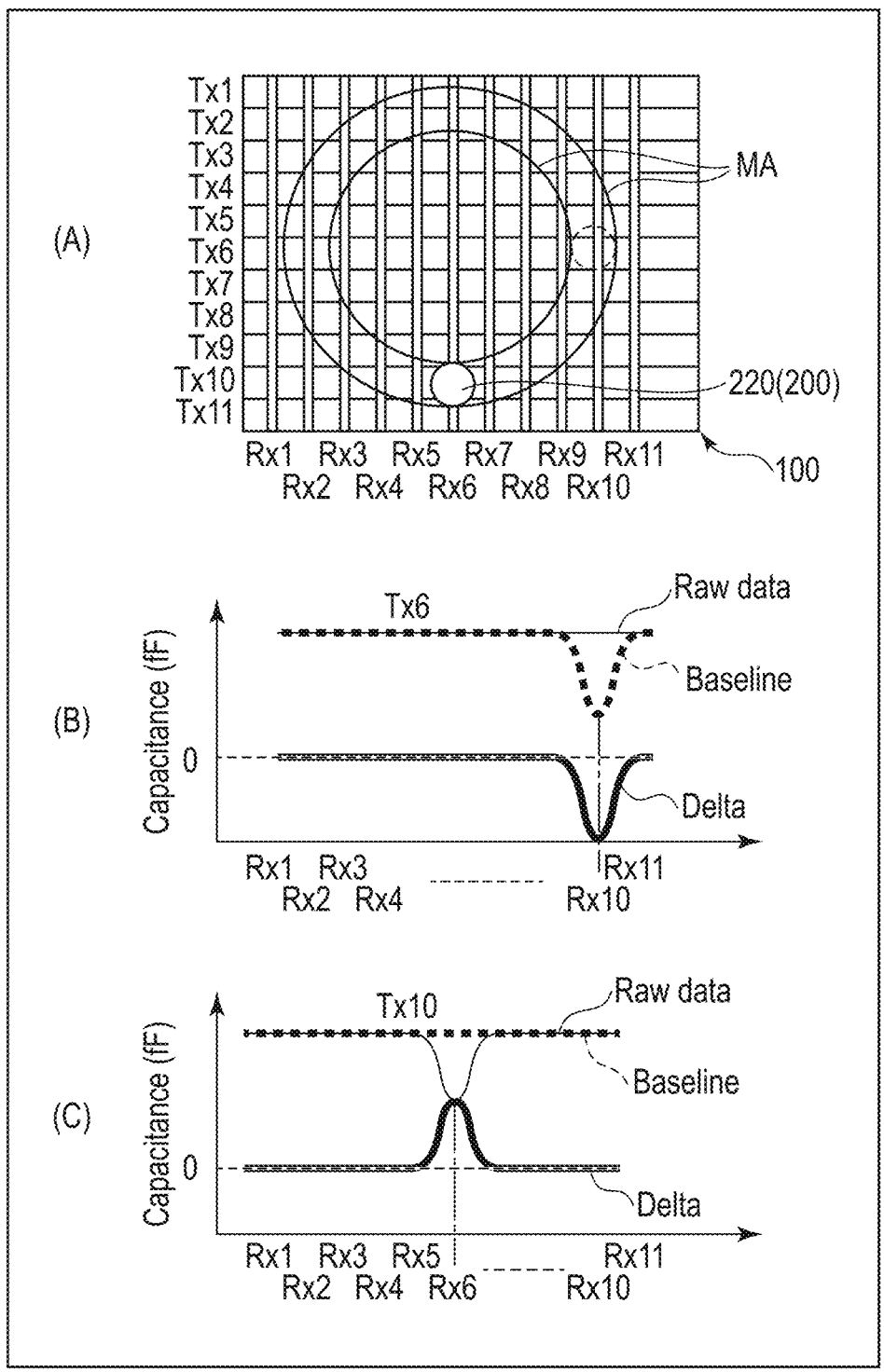
FIG. 8 is an illustration for explaining a state where the conductor 220 is rotated 90° with respect to the initial state.

FIG. 8 is an illustration for explaining a state where the conductor 220 is rotated 90° with respect to the initial state.

As shown in FIG. 8 (A), the conductor 220 overlaps the intersection of the drive electrode Tx10 and the detection electrode Rx6.

As shown in FIG. 8 (B), when the drive signal is transmitted to the drive electrode Tx6, the delta in the detection electrode Rx10 becomes a negative signal similarly to the example shown in FIG. 7 (B).

FIG. 8 (C) shows the baseline, the raw data and the delta when the drive signal is transmitted to the drive electrode Tx10. The raw data value in the detection electrode Rx6 becomes less than the raw data values in the other detection electrodes as the conductor 220 overlaps. Therefore, the delta in the detection electrode Rx6 becomes a positive signal.

According to the first configuration example, the rotation information of the input device 200 can be detected by analyzing the delta.

Next, an example of the detection of the rotation information in the second configuration example of the input device 200 will be described with reference to FIGS. 9 to 11.

Figure 9:
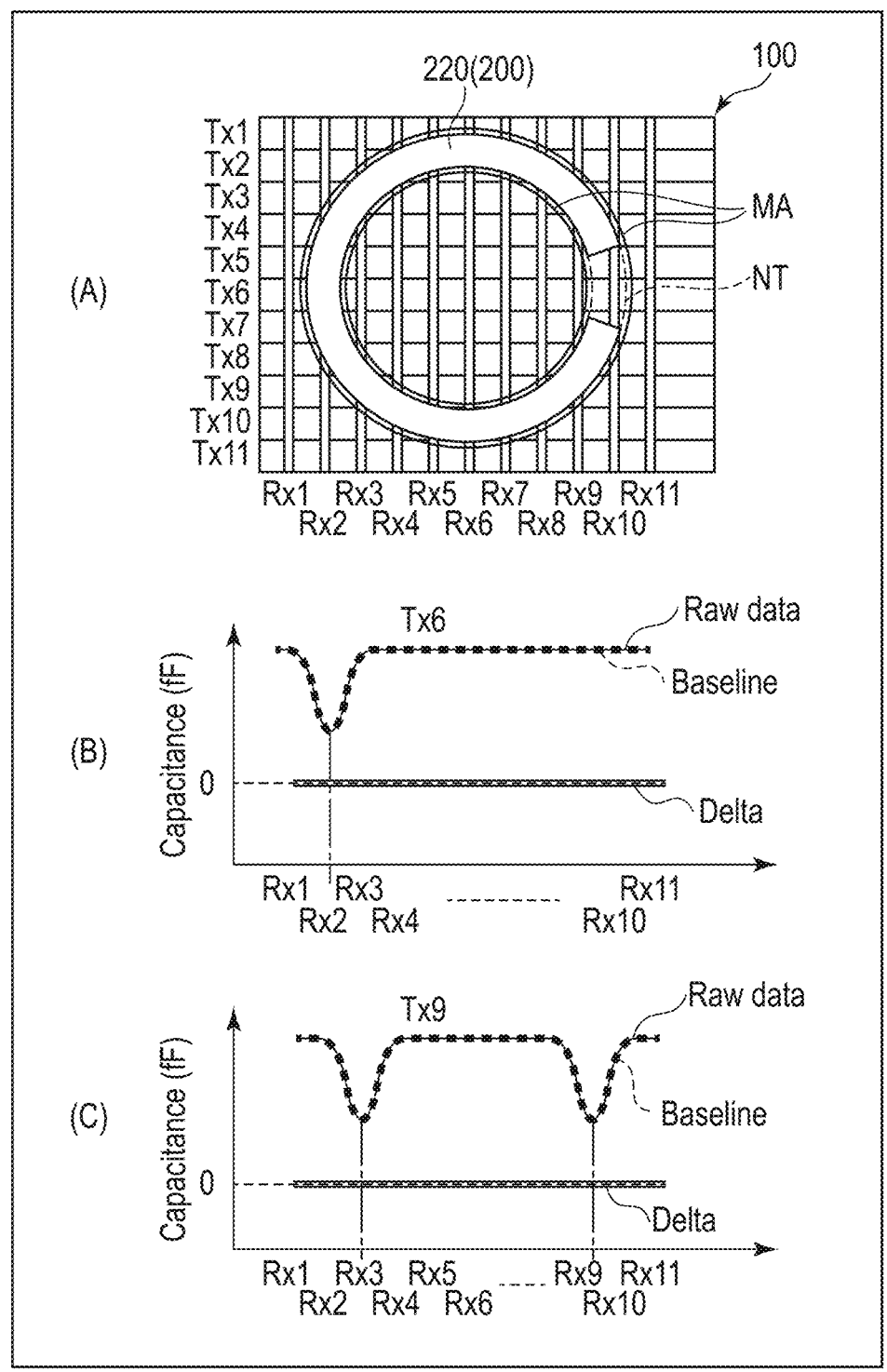

FIG. 9 is an illustration for explaining an initial state immediately after power is turned on.

FIG. 9 (A) is an illustration showing a state where the conductor 220 of the input device 200 is in contact with the touch panel 100. In the illustrated initial state, the notch NT of the conductor 220 overlaps the intersection of the drive electrode Tx6 and the detection electrode Rx10.

FIG. 9 (B) shows the baseline, the raw data and the delta when the drive signal is transmitted to the drive electrode Tx6. The conductor 220 overlaps the intersection of the drive electrode Tx6 and the detection electrode Rx2. Therefore, the baseline value and the raw data value in the detection electrode Rx2 are less than the baseline values and the raw data values in the other detection electrodes. In all the detection electrodes Rx1 to Rx11, the baseline value and the raw data value are the same level, and the delta is zero.

FIG. 9 (C) shows the baseline, the raw data and the delta when the drive signal is transmitted to the drive electrode Tx9. The conductor 220 overlaps the intersection of the drive electrode Tx9 and the detection electrode Rx3 and the intersection of the drive electrode Tx9 and the detection electrode Rx9. Therefore, the baseline values and the raw data values in the detection electrodes Rx3 and Rx9 are less than the baseline values and the raw data values in the other detection electrodes. In all the detection electrodes Rx1 to Rx11, the baseline value and the raw data value are the same level, and the delta is zero.

FIG. 10 is an illustration for explaining a state where the conductor 220 is rotated 45° with respect to the initial state.

As shown in FIG. 10 (A), the notch NT overlaps the intersection of the drive electrode Tx9 and the detection electrode Rx9.

FIG. 10 (B) shows the baseline, the raw data and the delta when the drive signal is transmitted to the drive electrode Tx6. The conductor 220 overlaps the intersection of the drive electrode Tx6 and the detection electrode Rx2 and the intersection of the drive electrode Tx6 and the detection electrode Rx10. The raw data value in the detection electrode Rx10 becomes less than the raw data values in the other detection electrodes similarly to the raw data value in the detection electrode Rx2. Therefore, the delta in the detection electrode Rx10 becomes a positive signal.

FIG. 10 (C) shows the baseline, the raw data and the delta when the drive signal is transmitted to the drive electrode Tx9. The conductor 220 overlaps the intersection of the drive electrode Tx9 and the detection electrode Rx3. The raw data value in the detection electrode Rx9 becomes the same level as the raw data values in the other detection electrodes as the notch NT overlaps. Therefore, the delta in the detection electrode Rx9 becomes a negative signal.

FIG. 11 is an illustration for explaining a state where the conductor 220 is rotated 90° with respect to the initial state.

As shown in FIG. 11 (A), the notch NT overlaps the intersection of the drive electrode Tx10 and the detection electrode Rx6.

As shown in FIG. 11 (B), when the drive signal is transmitted to the drive electrode Tx6, the delta in the detection electrode Rx10 becomes a positive signal similarly to the example shown in FIG. 10 (B).

FIG. 11 (C) shows the baseline, the raw data and the delta when the drive signal is transmitted to the drive electrode Tx10. The baseline shown here is data obtained depending on the fact that the conductor 220 overlaps the intersections of the drive electrode Tx10 and the detection electrodes Rx4 to Rx8 in the initial state shown in FIG. 9 (A). In the state shown in FIG. 11 (C), the conductor 220 overlaps the intersections of the drive electrode Tx10 and the detection electrodes Rx4 and Rx5 and the intersections of the drive electrode Tx10 and the detection electrodes Rx7 and Rx8. The raw data value in the detection electrode Rx6 becomes the same level as the raw data values in the other detection electrodes as the notch NT overlaps. Therefore, the delta in the detection electrode Rx6 becomes a negative signal.

According to the second configuration example, the rotation information of the input device 200 can be detected by analyzing the delta.

Figure 12:
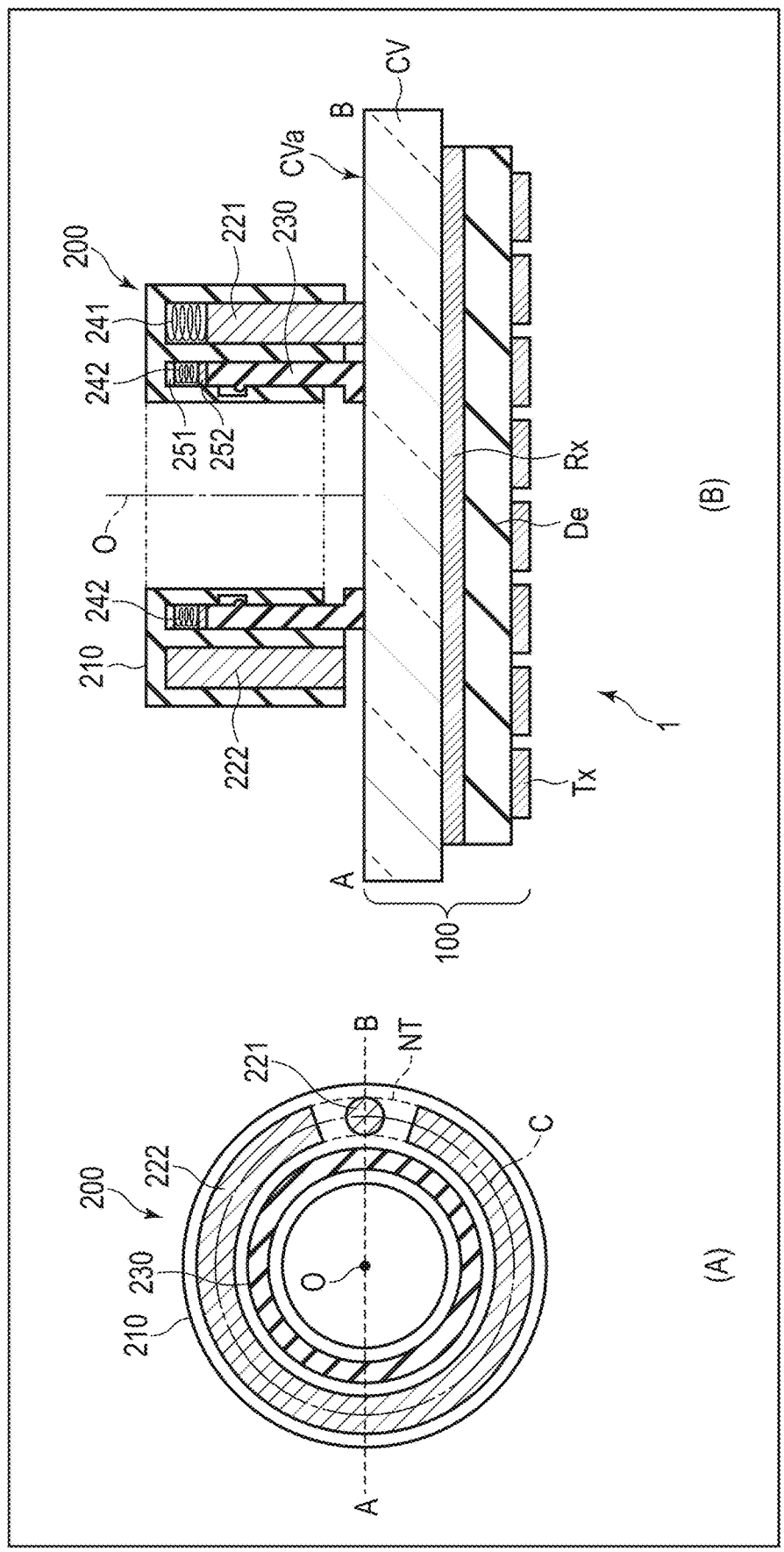
FIG. 12 is an illustration showing the third configuration example of the input device 200.

FIG. 12 is an illustration showing the third configuration example of the input device 200. FIG. 12 (A) is a plan view of the input device 200. FIG. 12 (B) is a cross-sectional view of the sensor device 1 when the input device 200 shown in FIG. 12 (A) is cut along line A-B.

As shown in FIG. 12 (A), the input device 200 comprises a first conductor 221 and a second conductor 222 located on the circumference C. The first conductor 221 and the second conductor 222 are both held by the knob 210. In addition, the first conductor 221 and the second conductor 222 are apart from each other. The first conductor 221 and the second conductor 222 are preferably electrically insulated from each other. The first conductor 221 is formed in a dot shape on the circumference C similarly to the first configuration example shown in FIG. 4, and is in contact with the touch panel 100. The second conductor 222 is formed in a C shape similarly to the second configuration example shown in FIG. 5, but is apart from the touch panel 100. The first conductor 221 is located in a notch NT of the second conductor 222.

As shown in FIG. 12 (B), springs 241 and 242 are disposed between the knob 210 and the first conductor 221 and between the knob 210 and the fixed body 230, respectively, along the rotation axis O. The spring 242 is held between holding plates 251 and 252. When the holding plates 251 and 252 are fixed to the knob 210, the holding plate 252 rotates in contact with the fixed body 230 as the knob 210 is rotated. Alternatively, when the holding plates 251 and 252 are fixed to the fixed body 230, the knob 210 rotates in contact with the holding plate 251.

The springs 241 and 242 are compressed as the knob 210 is pressed toward the touch panel 100. The second conductor 222 contacts the touch panel 100 as the knob 210 is pressed. In addition, the springs 241 and 242 extend as the knob 210 is released, and the second conductor 222 separates from the touch panel 100.

The first conductor 221 is in contact with the touch panel 100 regardless of whether the knob 210 is pressed or not, and corresponds to an object for detecting the rotation information of the input device 200 similarly to the conductor 220. The second conductor 222 contacts the touch panel 100 when the knob 210 is pressed, and corresponds to an object for detecting the pressing of the input device 200.

Figure 13:
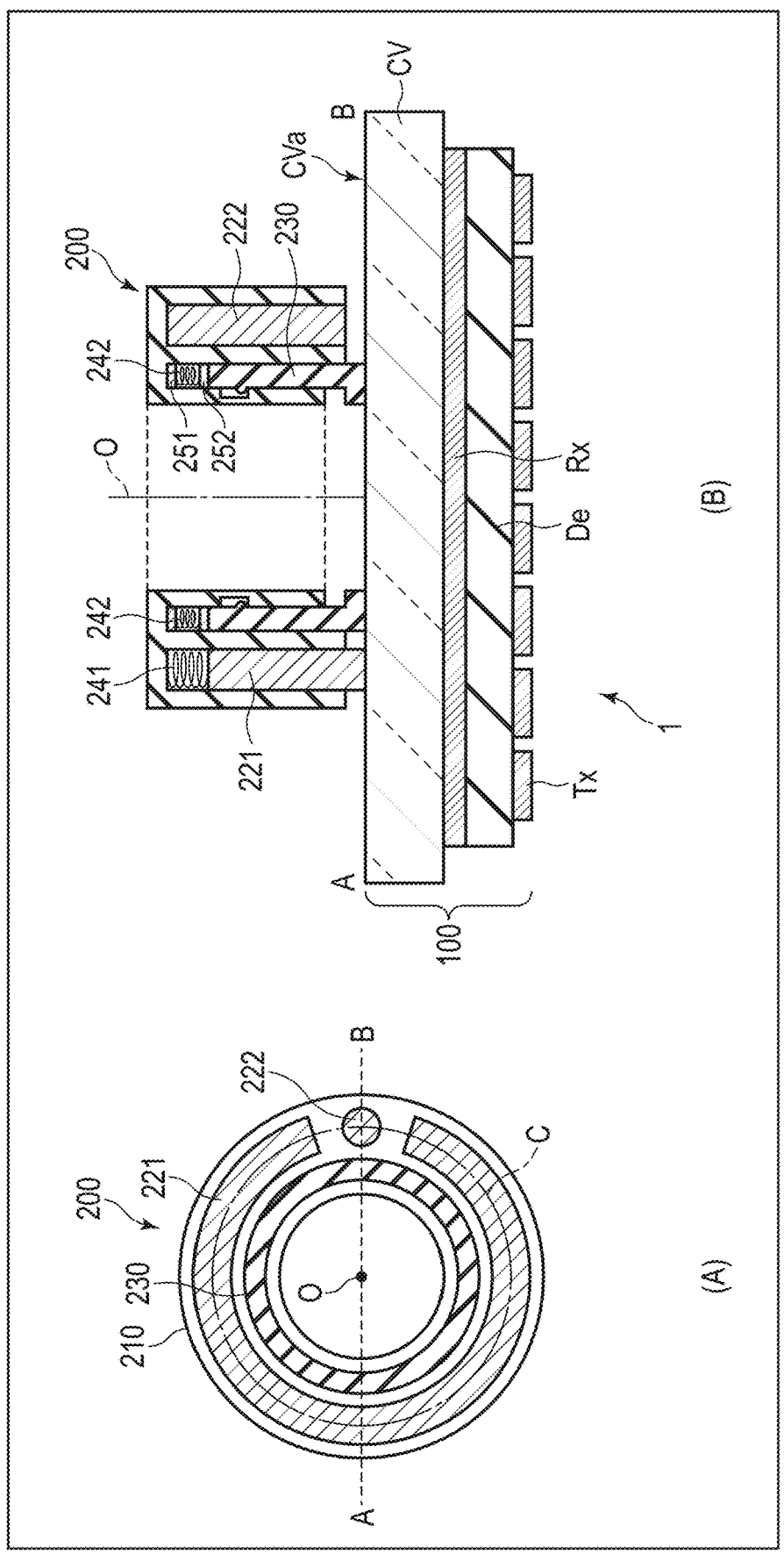
FIG. 13 is an illustration showing the fourth configuration example of the input device 200.

FIG. 13 is an illustration showing the fourth configuration example of the input device 200. FIG. 13 (A) is a plan view of the input device 200. FIG. 13 (B) is a cross-sectional view of the sensor device 1 when the input device 200 shown in FIG. 13 (A) is cut along line A-B. The fourth configuration example shown in FIG. 13 is different from the third configuration example shown in FIG. 12 in that the first conductor 221 is formed in a C shape and the second conductor 222 is formed in a dot shape.

According to the third configuration example and the fourth configuration example, the rotation information and the pressing information of the input device 200 can be detected.

Figure 14:
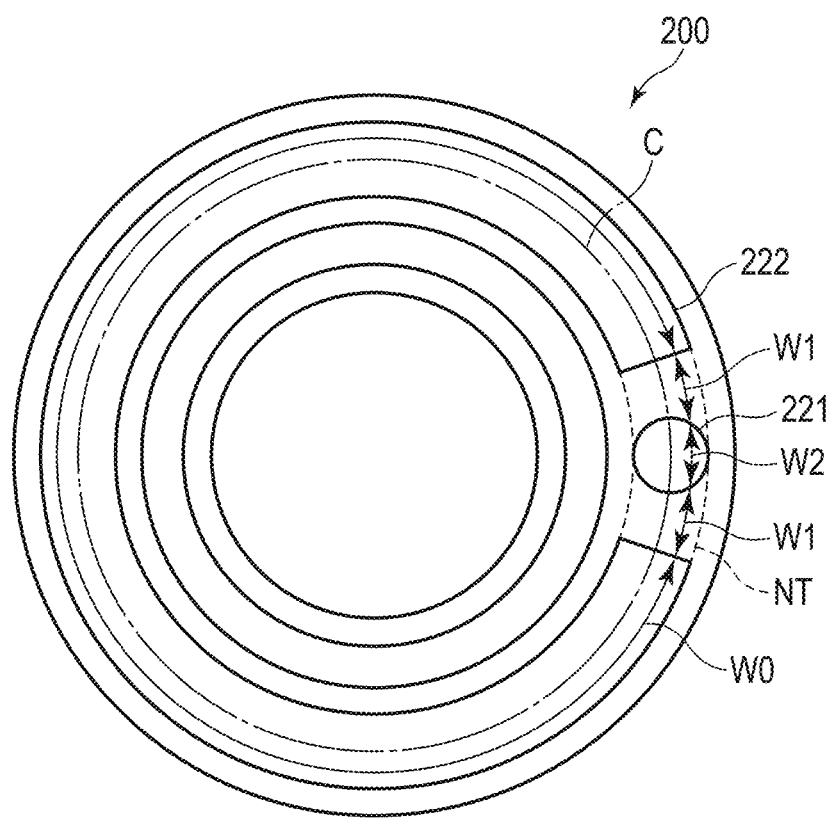
FIG. 14 is an illustration for explaining an example of the dimensions of a first conductor 221 and a second conductor 222 in the input device 200.

FIG. 14 is an illustration for explaining an example of the dimensions of the first conductor 221 and the second conductor 222 in the input device 200. The description here is based on the third configuration example where the first conductor 221 is formed in a dot shape and the second conductor 222 is formed in a C shape. The example of the dimensions described below can also be applied to the fourth configuration example where the first conductor 221 is formed in a C shape and the second conductor 222 is formed in a dot shape.

In the third configuration example, a width W0 along the circumference C of the second conductor 222 is greater than or equal to a width W2 along the circumference C of the first conductor 221. In the fourth configuration example, the width W0 along the circumference C of the first conductor 221 is greater than or equal to the width W2 along the circumference C of the second conductor 222. The width W0 is greater than or equal to ½ of the circumference C.

A space W1 along the circumference C between the first conductor 221 and the second conductor 222 is greater than or equal to a space Pr between the detection electrodes Rx which are adjacent to each other, and is less than or equal to ½ of the circumference C. In one example, a width Wr of the detection electrode Rx shown in FIG. 1 is greater than or equal to 0.1 mm, and is less than a sensor pitch P. The sensor pitch P here corresponds to the pitch between the adjacent detection electrodes Rx in FIG. 1. In this case, the space Pr between the detection electrodes Rx is defined as (P−Wr).

The width W2 along the circumference C of the first conductor 221 is greater than or equal to 1 time but less than or equal to 2 times a width Wt of the drive electrode Tx. In one example, the width Wt of the drive electrode Tx shown in FIG. 1 is 5 mm to 10 mm, and the width W2 is 5 mm to 20 mm.

Figure 15:
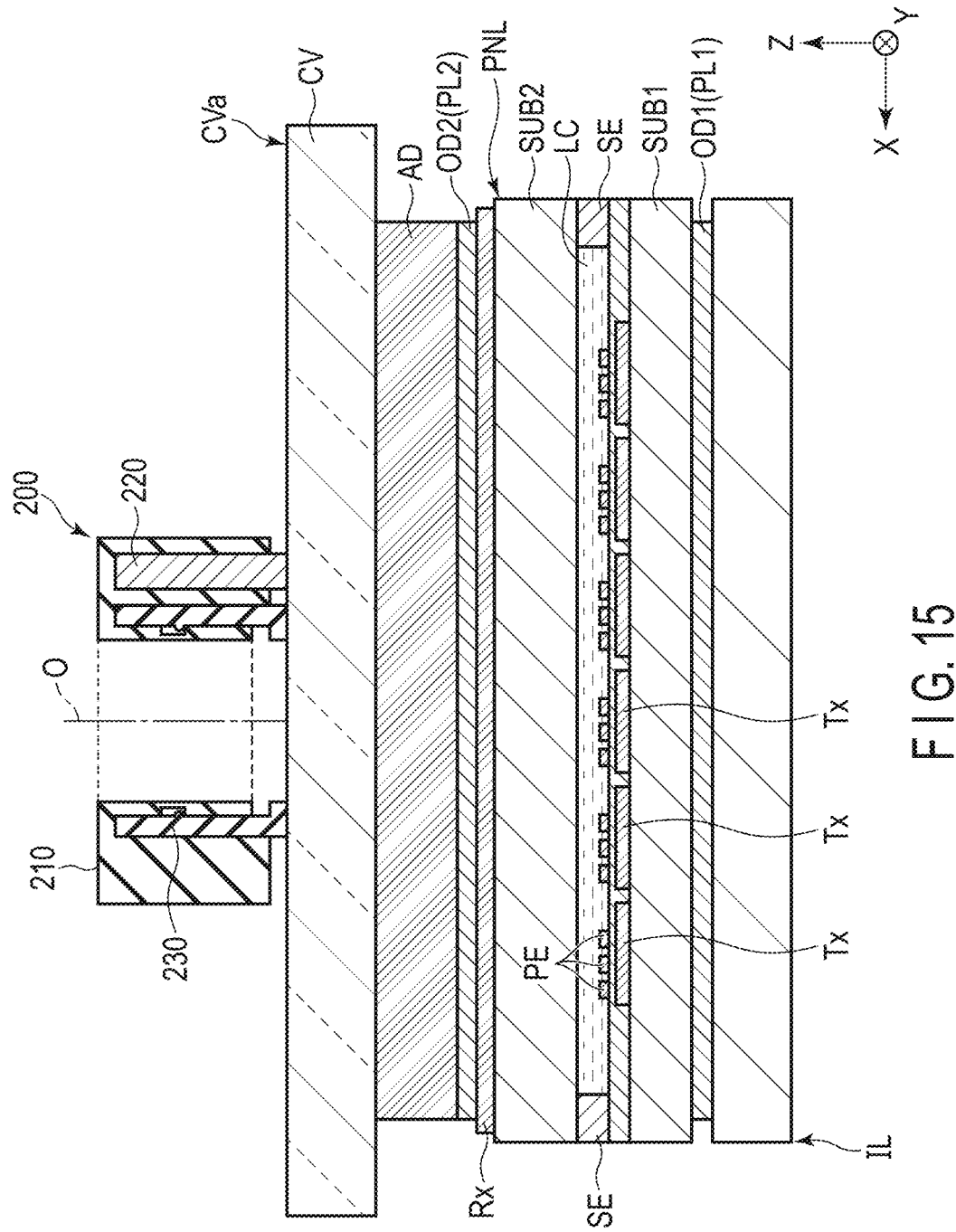
FIG. 15 is a cross-sectional view showing a configuration example of a display device DSP equipped with the sensor device 1.

FIG. 15 is a cross-sectional view showing a configuration example of a display device DSP equipped with the sensor device 1.

The display device DSP comprises a display panel PNL and an illumination device IL. In one example, the display panel PNL is, for example, a liquid crystal display panel, and comprises a first substrate SUB1, a second substrate SUB2 and a liquid crystal layer LC. The first substrate SUB1 and the second substrate SUB2 are bonded together by a sealant SE. The liquid crystal layer LC is held between the first substrate SUB1 and the second substrate SUB2. Note that the display panel PNL may be a display panel comprising an organic electroluminescent element, an electrophoretic element or the like as a display element.

The display panel PNL incorporates the touch panel 100 of the sensor device 1. That is, the first substrate SUB1 comprises the drive electrodes Tx of the touch panel 100, and pixel electrodes PE. One drive electrode Tx is opposed to more than one pixel electrode PE. The second substrate SUB2 comprises the detection electrodes Rx of the touch panel 100. The drive electrodes Tx and the detection electrodes Rx are disposed crossing each other in an XY-plane defined by a first direction X and a second direction Y. In one example, the drive electrodes Tx are arranged at intervals along the first direction X, and the drive electrodes Tx each extend in the second direction Y. In addition, the detection electrodes Rx are arranged at intervals along the second direction Y, and the detection electrodes Rx each extend in the first direction X. Although not described in detail, an insulating substrate and an organic insulating film of the second substrate SUB2, and the liquid crystal layer LC correspond to the dielectric layer De of the touch panel 100.

An optical element OD1 including a polarizer PL1 is located between the first substrate SUB1 and the illumination device IL, and is bonded to the first substrate SUB1. An optical element OD2 including a polarizer PL2 is located between the second substrate SUB2 and the cover member CV, and is bonded to the second substrate SUB2. The cover member CV is bonded to the optical element OD2 by a transparent adhesive AD.

The input device 200 is disposed on the surface CVa of the cover member CV. The conductor 220 is in contact with the surface CVa. The knob 210 is formed in a tubular shape extending along the rotation axis O. Therefore, an image displayed on the display panel PNL can be visually recognized not only in an area outside the input device 200 but also in an area inside surrounded by the knob 210.

The configuration example shown in FIG. 15 corresponds to a configuration example showing a so-called in-cell type in which the touch panel 100 is incorporated in the display panel PNL. However, the touch panel 100 may be an out-cell type or an on-cell type in which the touch panel 100 is disposed overlapping the display panel PNL.

As described above, according to the present embodiment, a sensor device and an input device capable of improving operability can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sensor device comprising:
an electrostatic capacitive touch panel; and
an input device mounted on the touch panel, wherein
the input device comprises:
a knob rotatably disposed about a rotation axis;
a first conductor held by the knob and being in contact with the touch panel in a part of a circumference about the rotation axis; and
a second conductor held by the knob and being apart from the first conductor, wherein
the first conductor is in contact with the touch panel regardless of whether the knob is pressed or not,
the second conductor is not in contact with the touch panel as the knob is not pressed,
the second conductor is in contact with the touch panel as the knob is pressed,
one conductor of the first conductor and the second conductor extends along the circumference and is formed in a C shape having a notch in a part of the circumference,
another conductor of the first conductor and the second conductor is located in the notch, and
a length along the circumference of the one conductor is greater than a length along the circumference of the another conductor.

2. The sensor device of claim 1, wherein
the touch panel comprises a plurality of drive electrodes and a plurality of detection electrodes crossing the drive electrodes, wherein
a space along the circumference between the first conductor and the second conductor is greater than or equal to a space between the detection electrodes adjacent to each other, and is less than or equal to ½ of the circumference.

3. The sensor device of claim 1, wherein
the touch panel comprises a plurality of drive electrodes and a plurality of detection electrodes crossing the drive electrodes, and
a length along the circumference of the other conductor is greater than or equal to 1 time but less than or equal to 2 times a width of the drive electrode.

4. The sensor device of claim 2, further comprising a sensor controller, wherein
the sensor controller is configured to transmit a drive signal to the drive electrodes, receive a sensor signal from the detection electrodes, and detect rotation information of the knob and pressing information of the knob.

5. The sensor device of claim 1, wherein
the second conductor extends along the circumference, and
a length along the circumference of the second conductor is greater than a length along the circumference of the first conductor.

6. The sensor device of claim 5, wherein the length along the circumference of the second conductor is greater than or equal to ½ of the circumference.

7. The sensor device of claim 1, wherein
the first conductor extends along the circumference, and
a length along the circumference of the first conductor is greater than a length along the circumference of the second conductor.

8. The sensor device of claim 7, wherein the length along the circumference of the first conductor is greater than or equal to ½ of the circumference.

9. An input device mounted on an electrostatic capacitive touch panel comprising:
a knob rotatably disposed about a rotation axis;
a first conductor held by the knob and being in contact with the touch panel in a part of a circumference about the rotation axis; and
a second conductor held by the knob and being apart from the first conductor, wherein
the first conductor is in contact with the touch panel regardless of whether the knob is pressed or not,
the second conductor is not in contact with the touch panel as the knob is not pressed,
the second conductor is in contact with the touch panel as the knob is pressed,
one conductor of the first conductor and the second conductor extends along the circumference and is formed in a C shape having a notch in a part of the circumference,
another conductor of the first conductor and the second conductor is located in the notch, and
a length along the circumference of the one conductor is greater than a length along the circumference of the another conductor.

10. The input device of claim 9, wherein
the second conductor extends along the circumference, and
a length along the circumference of the second conductor is greater than a length along the circumference of the first conductor.

11. The input device of claim 10, wherein the length along the circumference of the second conductor is greater than or equal to ½ of the circumference.

12. The input device of claim 9, wherein
the first conductor extends along the circumference, and
a length along the circumference of the first conductor is greater than a length along the circumference of the second conductor.

13. The input device of claim 12, wherein the length along the circumference of the first conductor is greater than or equal to ½ of the circumference.

* * * * *